United States Patent
Amirzadeh-Asl et al.

(10) Patent No.: US 6,454,831 B1
(45) Date of Patent: Sep. 24, 2002

(54) USE OF A FINE-GRAINED PRODUCT PRODUCED DURING THE PRODUCTION OF TITANIUM DIOXIDE

(75) Inventors: Djamschid Amirzadeh-Asl, Moers; Wolfgang Roder, Rheinberg; Wolf-Dieter Griebler, Moers, all of (DE)

(73) Assignee: Metallgesellschaft AG, Frankfurt am Main (DE)

( * ) Notice: Subject to any disclaimer, the term of this patent is extended or adjusted under 35 U.S.C. 154(b) by 0 days.

(21) Appl. No.: 09/743,267
(22) PCT Filed: Jul. 1, 1999
(86) PCT No.: PCT/EP99/04525
§ 371 (c)(1), (2), (4) Date: Apr. 13, 2001
(87) PCT Pub. No.: WO00/01853
PCT Pub. Date: Jan. 13, 2000

(30) Foreign Application Priority Data

Jul. 6, 1998 (DE) .......................... 198 30 102

(51) Int. Cl.⁷ ................................................. C22B 7/00
(52) U.S. Cl. ..................................................... 75/301
(58) Field of Search ............................................ 75/301

(56) References Cited

FOREIGN PATENT DOCUMENTS

| DE | 4304724 | 5/1994 | |
| DE | 4419816 C1 * | 6/1995 | ............. C21B/3/02 |
| DE | 4419816 | 6/1995 | |
| EP | 714992 A1 * | 6/1996 | ........... C22B/34/12 |

OTHER PUBLICATIONS

"Titania slag for improving blast furnace heart lining life", Stahl und Eisen, Bd. 100, Nr. 17, Aug. 15, 1980 (Seite 1037) XP002023684.
English abstract of DE 4419816 C1 published Jun. 29, 1995 by Amizadeh–Asl et al.*
Derwent Acc No 1996–261626. Hartmann, A. Abstract of EP–714992–A1. Published on Jun. 5, 1996.*

* cited by examiner

Primary Examiner—Roy King
Assistant Examiner—Tima McGuthry-Banks
(74) Attorney, Agent, or Firm—Antonelli, Terry, Stout & Kraus, LLP

(57) ABSTRACT

A fine-grained product with a grain size of 100%<5 mm is obtained during the production of titanium dioxide in the chloride method in which titanium-containing raw material is reacted with gaseous chlorine in the presence of a carbon-rich substance, preferably coal and/or coke, in a chlorination reactor, preferably with a fluidized bed, to form titanium tetrachloride, the fine-grained product consisting, in the dried state, of the main constituents $TiO_2$, coal and $SiO_2$, mixed with filter salt (iron sulfate that is obtained during dilute acid recovery), residues containing $TiO_2$ from $TiO_2$-production according to the sulfate method, coal, sulfur, and ilmenite/$TiO_2$-slag. This mixture is treated in a fluidized bed furnace or rotating tubular furnace at temperatures of 900 to 1,300° C. The mixture is used as a flux for the purpose of improving the durability of the brick lining of a furnace for the smelting-metallurgical production of metallic materials.

4 Claims, No Drawings

USE OF A FINE-GRAINED PRODUCT PRODUCED DURING THE PRODUCTION OF TITANIUM DIOXIDE

DESCRIPTION

The invention relates to a fine-grained product with a grain size of 100%<5 mm that is obtained during the production of titanium dioxide in the chloride method in which titanium-containing raw material is reacted with gaseous chlorine in the presence of a carbon-rich substance, preferably coal and/or coke, in a chlorination reactor, preferably with a fluidized bed, to form titanium tetrachloride, the fine-grained product being composed, in the dried state, of

- 10 to 80% by weight $TiO_2$
- 20 to 60% by weight coal and
- 5 to 20% by weight $SiO_2$.

In the chloride method, titanium ores or "titanium slag" are chlorinated by reacting the titanium-containing raw material with gaseous chlorine in a chlorination reactor while subject to the addition of a carbon-rich substance, in particular coke, for example in a circulating fluidized bed, to form titanium tetrachloride. The liquid thereby formed is freed of all accompanying substances by means of a distillation process so that a very pure starting product is available for the rest of the process. The titanium tetrachloride is then reacted in a burner, while subject to the addition of oxygen, to form titanium dioxide (INORGANIC PIGMENTS, Manufacturing Processes, Noyes Data Corporation, Park Ridge, N.J., USA, 1980, pages 5 to 7).

During this process a portion of the non-reacted titanium-containing raw material/coal and/or coke mixture, which contains as its main constituents

- 10 to 80% by weight $TiO_2$
- 20 to 60% by weight coal and
- optionally 5 to 20% by weight $SiO_2$
- with a grain size of 100%<5 mm, accumulates in the dust-removal filter.

Since this fine-grained product would impede the carrying out of the further treatment of the titanium tetrachloride, the fine-grained product is removed from the process and dumped or disposed of in another way.

The use of a titanium-containing flux to increase the durability of the refractory brick lining of a furnace is described in DE 4304724 C1. The flux consists of a powdery mixture of residues from $TiO_2$-production and one or more constituents selected from coal, iron, iron oxide or their residues.

In view of the fact that the provision of dumping space or other means of disposal are linked with comparatively high costs and in an effort to supply waste materials for economical utilization, the underlying object of the present application is to present the possibility of making economical use of the fine-grained product described above together with the use of the filter salt (iron sulfate) that results during dilute acid recovery.

The solution to this object consists in using a fine-grained product with a grain size of 100%<5mm that is obtained during the production of titanium dioxide in the chloride method in which titanium-containing raw material is reacted with gaseous chlorine in the presence of a carbon-rich substance, preferably coal and/or coke, in a chlorination reactor, preferably with a fluidized bed, to form titanium tetrachloride, the fine-grained product consisting, in the dried state, of the main constituents

- 10 to 80% by weight $TiO_2$
- 20 to 60% by weight coal and
- 5 to 20% by weight $SiO_2$, mixed with

- 20 to 80% by weight filter salt (iron sulfate that is obtained during dilute acid recovery),
- 0 to 60% by weight residues containing $TiO_2$ from $TiO_2$-production according to the sulfate method,
- 0 to 20% by weight coal,
- 0 to 20% by weight sulfate,
- 0 to 50% by weight ilmenite/$TiO_2$-slag, with this mixture being treated in a fluidized bed furnace or rotating tubular furnace at temperatures of 900 to 1,300° C., as a flux for the purpose of improving the durability of the brick lining of a furnace for the smelting-metallurgical production of metallic materials.

The flux can be present in powder form or in the form of briquettes, pellets or granulated material containing one or more of the binding agents portland cement, blast-furnace cement, aluminous cement, electrostatic-filter ash, bitumen and molasses. The flux can also be used in the form of sinter.

Further coal or coal-containing residues is/are preferably also added to the mixture that already contains coal so that the iron sulfate (filter salt) is reduced to iron oxide.

The invention is explained in greater detail in the following with the aid of an exemplifying embodiment.

EXEMPLIFYING EMBODIMENT

20% by weight of a fine-grained product that is obtained during the production of $TiO_2$ according to the chloride method and which has a moisture content of

- 25% by weight and the composition on analysis of
- 33% by weight coke
- 32% by weight $TiO_2$
- 7% by weight $SiO_2$ is processed in a mixing installation with 50% by weight filter salt (iron sulfate) from dilute acid recovery and having a moisture content of 4.2% by weight, an $Fe_2SO_4$ content of 38% by weight and a $TiO_2$ content of 2.6% by weight, with 4% by weight burn-off residue ($Fe_2O_3$) from sulfuric-acid production with an $Fe_2O_3$ content of 69% by weight and a $TiO_2$ content of 8% by weight, with 4% by weight fine coal, and with 20% by weight sulfur to form an homogeneous mixture. The mixture is fed into a furnace with a stationary fluidized bed and subjected to heat-treatment at a temperature of approximately 1,000° C. The powder product discharged from the fluidized bed furnace with a grain size of 100%<5 mm contains as its main constituents

- 29% by weight $TiO_2$
- 24% by weight Fe2O3 and
- 4% by weight $SiO_2$.

The sulfur addition serves both as a source of energy and also as a way of adjusting the necessary sulfur-dioxide concentration in the waste gas. The sulfur dioxide that is generated during the heat-treatment of the mixture is drawn off from the fluidized bed furnace and used to produce sulfuric acid. The product produced in this way can advantageously be supplied to a metallurgical process.

What is claimed is:

1. A process comprising adding a flux to a furnace for the smelting metallurgical production of metallic materials, the flux comprising a fine-grained product with a grain size of 100%<5 mm that is obtained during the production of titanium dioxide in the chloride method in which titanium-containing raw material is reacted with gaseous chlorine in the presence of a carbon-rich substance, in a chlorination reactor, to form titanium tetrachloride, the fine-grained product comprising, in the dried state, the main constituents 10 to 80% by weight $TiO_2$ 20 to 60% by weight coal and 5 to 20% by weight $SiO_2$, mixed with 20 to 80% by weight filter salt, 0 to 60% by weight residues containing $TiO_2$ from $TiO_2$-production according to the sulfate method, 0 to 20% by weight coal, 0 to 20% by weight sulfiir, 0 to 50% by weight ilmenite/$TiO_2$-slag, with this mixture being treated in a fluidized bed furnace or rotating tubular furnace at temperatures of 900 to 1,300° C., the flux being added for the purpose of improving the durability of the brick lining of a furnace for the smelting-metallurgical production of metallic materials.

2. The process according to claim 1, wherein the carbon rich substance is selected from the group consisting of coal and coke.

3. The process according to claim 1, wherein the chlorination reactor includes a fluidized bed.

4. The process according to claim 1, wherein the filter salt is iron sulfate obtained during dilute acid recovery.

* * * * *